(12) United States Patent
Tonsing et al.

(10) Patent No.: US 12,277,818 B1
(45) Date of Patent: *Apr. 15, 2025

(54) REMOTE PROGRAMMING SYSTEM AND METHOD FOR REPLACEMENT VEHICLE KEYS

(71) Applicant: iKeyless, LLC, Louisville, KY (US)

(72) Inventors: Terry Tonsing, St. Louis, MO (US); Patrick Linsenbardt, St. Louis, MO (US)

(73) Assignee: iKeyless, LLC, Louisville, KY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/775,350

(22) Filed: Jul. 17, 2024

Related U.S. Application Data

(63) Continuation of application No. 18/594,872, filed on Mar. 4, 2024, now abandoned, which is a
(Continued)

(51) Int. Cl.
*G07C 9/00* (2020.01)
*B60R 25/20* (2013.01)
*G07C 5/00* (2006.01)

(52) U.S. Cl.
CPC .......... *G07C 9/00817* (2013.01); *B60R 25/20* (2013.01); *G07C 5/008* (2013.01);
(Continued)

(58) Field of Classification Search
CPC ..... H04L 63/068; H04L 9/0816; B60R 25/24; G07C 9/00309; G07C 9/00857; G07C 9/00817

See application file for complete search history.

(56) References Cited

U.S. PATENT DOCUMENTS 5,864,297 A 1/1999 Sollestre
6,434,455 B1 8/2002 Snow
(Continued)

OTHER PUBLICATIONS

Automotive Electronic Solutions LLC "Pre & Post Scans," Webpage, Longview, TX, https://www.autoesolutions.com/electronic-auto-services, 4 pages.
(Continued)

*Primary Examiner* — Mirza F Alam
(74) *Attorney, Agent, or Firm* — Gray Ice Higdon (57) ABSTRACT

A remote programming system for engine control units of vehicles operates by coupling an onboard diagnostic interface device with an engine control unit of a vehicle, communicatively linking the interface device with a hand held device, communicatively linking the hand held device with a back end programming machine that is remotely located from the vehicle, communicating identifying information about the vehicle to the programming machine via the interface device, the hand held device, and the communication network(s), determining an action and programming information needed to program the engine control unit of the vehicle to accept a replacement key, sending the action and programming information from the programming machine to the hand held device via the communication network(s), and programing the engine control unit of the vehicle to accept the replacement key to activate the vehicle using or responsive to use of the action and programming information.

20 Claims, 4 Drawing Sheets

Related U.S. Application Data continuation of application No. 17/545,059, filed on Dec. 8, 2021, now abandoned, which is a continuation of application No. 16/842,426, filed on Apr. 7, 2020, now Pat. No. 11,232,661, which is a continuation of application No. 15/896,845, filed on Feb. 14, 2018, now Pat. No. 10,650,628.

(60) Provisional application No. 62/583,130, filed on Nov. 8, 2017.

(52) U.S. Cl.
CPC .................. *B60R 2325/205* (2013.01); *G07C 2009/00825* (2013.01); *G07C 2009/00841* (2013.01)

(56) References Cited

U.S. PATENT DOCUMENTS

| | | | |
|---|---|---|---|
| 6,501,369 | B1 | 12/2002 | Treharne |
| 6,512,461 | B1 | 1/2003 | Benzie |
| 8,688,313 | B2 | 4/2014 | Margol |
| 9,002,536 | B2 | 4/2015 | Hatton |
| 9,684,500 | B2 | 6/2017 | Margol |
| 10,650,628 | B2 | 5/2020 | Tonsing |
| 10,755,506 | B2 | 8/2020 | Determann |
| 11,120,654 | B2 | 9/2021 | Johnson |
| 11,127,230 | B2 | 9/2021 | Johnson |
| 11,232,661 | B2 | 1/2022 | Tonsing |
| 2005/0267655 | A1 | 12/2005 | Gessner |
| 2009/0278656 | A1 | 11/2009 | Lopez |
| 2011/0032075 | A1 | 2/2011 | Alrabady |
| 2011/0106374 | A1 | 5/2011 | Margol |
| 2013/0069761 | A1 | 3/2013 | Tieman |
| 2013/0237189 | A1* | 9/2013 | Nishidai ............... H04W 12/06 455/411 |
| 2014/0232521 | A1* | 8/2014 | Kawamura ........ G07C 9/00896 340/5.26 |
| 2014/0266587 | A1 | 9/2014 | Lopez |
| 2014/0380296 | A1* | 12/2014 | Pal ........................... G06F 8/65 717/171 |
| 2015/0010145 | A1* | 1/2015 | Iwashita ............... H04L 9/0861 380/44 |
| 2015/0062441 | A1* | 3/2015 | Martin ................. H04N 5/4403 348/734 |
| 2016/0267730 | A1* | 9/2016 | Wadhwani ............. B60L 53/65 |
| 2018/0211463 | A1 | 7/2018 | Mala |
| 2020/0384554 | A1 | 12/2020 | Robertson |
| 2021/0035390 | A1 | 2/2021 | Determann |
| 2021/0237175 | A1 | 8/2021 | Robertson |
| 2022/0092899 | A1 | 3/2022 | Tonsing |
| 2024/0203181 | A1 | 6/2024 | Tonsing |

OTHER PUBLICATIONS

Autel, MaxiSys MS906 User Manual, 106 pages, dated Oct. 2015.
Smartbox Automotive, How to Program a Proximity Remote, https://www.youtube.com/watch?v=rftmpt5ubeU, datedYoutube.com, Retrieved from: Nov. 4, 2016.
Garcia, Flavio D., et al., Lock It and Still Lose It—On the (In)Security of Automotive Remote Keyless Entry Systems, 25th USENIX Security Symposium, 17 pages, dated Aug. 10, 2016.
Autodiagnos, Key programming using INcodes and OUTcodes—Ford 'Coded' PATS, 2 pages, Retrieved on Apr. 30, 2024.
Smartbox Automotive, How to Program a FOBIK, Youtube.com, dated Nov. 4, 2016.
Snap-On Tools, Ford PATS Key Programming—Diagnostic Quick Tips | Snap-On Training Solutions, Youtube.com, dated Dec. 16, 2015.
Alse Mexicana, Dodge Journey 2012 RFH, Youtube.com, dated Dec. 8, 2011.
Advanced Diagnostics USA, 2017 Ford Mustang GT Prox, Youtube.com, dated Mar. 4, 2017.
Tcodemvp, MVP / TCode PRO Infiniti G37, Youtube.com, dated Mar. 29, 2009.
Bigkrisp, How to Program Proximity Key—Remote to Nissan Sentra, Youtube.com, dated Jun. 15, 2015.
Autosmartadvisor, 2011 Nissan Cube Proximity—MVP & TCODE—PRO, Youtube.com, dated 2011.
Edgemotors, VW Audi Immobilizer Key Programming Smart Key by Edge Motors, Youtube.com, dated Nov. 7, 2015.
FCA wiTECH, Advantages of wiTech 2.0, Youtube.com, dated May 19, 2016.

* cited by examiner

REMOTE PROGRAMMING SYSTEM AND METHOD FOR REPLACEMENT VEHICLE KEYS

CROSS-REFERENCE TO RELATED APPLICATIONS

This application is a continuation of U.S. patent application Ser. No. 18/594,872 (filed 4 Mar. 2024), which is a continuation of U.S. patent application Ser. No. 17/545,059 (filed 8 Dec. 2021), which is a continuation of U.S. patent application Ser. No. 16/842,426 (filed 7 Apr. 2020, now U.S. Pat. No. 11,232,661), which is a continuation of U.S. patent application Ser. No. 15/896,845 (filed 14 Feb. 2018, now U.S. Pat. No. 10,650,628), which claims priority to U.S. Provisional Application No. 62/583,130 (filed 8 Nov. 2017). The entire disclosures of these applications are incorporated herein by reference.

FIELD

Embodiments of the subject matter disclosed herein relate to systems and methods for programming electronic keys of vehicles.

BACKGROUND

Ignition systems of many known vehicles are activated by keys. Engine control units of the vehicles are programmed to include unique identifying information of keys that are permitted to start ignition systems of the vehicles. For example, information that uniquely identifies a key can be stored in the key and in a memory included in and/or accessible by the engine control unit of a vehicle. The engine control unit can electronically (e.g., through wired and/or wireless connections) read the identifying information stored in the key and see if this information matches or otherwise corresponds with the identifying information stored in the vehicle. If the key information matches the stored information, then the engine control unit allows the key to start the vehicle. Otherwise, the engine control unit will not allow the key to start the vehicle.

One problem is the need to program the engine control unit of a vehicle to accept a replacement key. The original key or keys for a vehicle may no longer available due to loss, repossession, etc. Currently, programming the engine control unit of a vehicle to accept a different or new key (e.g., a replacement key) requires an individual with specialized training and education (e.g., a locksmith) to travel to the location of the vehicle to program the engine control unit of the vehicle to accept the replacement key. This programming can require specialized skills or experience of the locksmith, and can involve complicated and costly hardware equipment. A person wanting to program the engine control unit to accept the replacement key may need to wait a significant amount of time before the locksmith is available, and typically is required to pay for the presence and work of the locksmith. This can add to the cost of replacing the key and can limit or restrict re-sale opportunities for the person to recoup financial losses on the lien or note on the vehicle.

Additionally, some entities that handle or possess many vehicles may be unable to verify whether the engine control unit of one or more vehicles has been successfully programmed to accept a replacement key and, if a replacement key does not work to start a vehicle, may be unable to determine whether the non-functioning replacement key is due to loss of the key, error by the locksmith, or the like. For example, repossession company may hire a first locksmith to program an engine control unit of a repossessed vehicle to accept a replacement key, but the replacement key may get lost while the vehicle is being transported to an auction company from the repossession company by a transportation company.

As another example, a second locksmith hired by the auction company may contend that the engine control unit of the vehicle was not successfully programmed to accept the replacement key (even if the engine control unit was successfully programmed to accept the replacement key). The auction company may then pay for the second locksmith to program the engine control unit of the vehicle to accept another, different replacement key and may attempt to pass this cost onto the repossession company. Without being able to verify or prove that the previous programming of the engine control unit by the first locksmith before the vehicle was sent for transportation was successful, the repossession company may be forced to pay for the additional replacement key and additional programming of the engine control unit.

BRIEF DESCRIPTION

In one embodiment, a method includes coupling an onboard diagnostic interface device with an engine control unit of a vehicle, communicatively linking the interface device with a mobile, hand held device, communicatively linking (via one or more communication networks) the hand held device with a back end programming machine that is remotely located from the vehicle, communicating identifying information about the vehicle to the programming machine via the interface device, the hand held device, and the one or more communication networks, determining (at the programming machine) one or more actions and programming information needed to program the engine control unit of the vehicle to accept a replacement key to activate the vehicle, sending the one or more actions and programming information from the programming machine to the hand held device via the one or more communication networks, and programming the engine control unit of the vehicle to accept the replacement key to activate the vehicle using the one or more actions and programming information.

In one embodiment, a system includes a back-end programming machine including hardware circuitry and one or more processors configured to establish a communication connection with an engine control unit of a vehicle that is remotely located from the programming machine via an onboard diagnostic interface device, a mobile, hand held device, and one or more communication networks. The one or more processors are configured to receive identifying information about the vehicle from the engine control unit via the interface device, the hand-held device, and the one or more communication networks. The one or more processors also are configured to determine one or more actions and programming information needed to program the engine control unit of the vehicle to accept a replacement key to activate the vehicle. The one or more processors are configured to send the one or more actions and programming information to the hand-held device via the one or more communication networks and to program the engine control unit of the vehicle to accept the replacement key to activate the vehicle using the one or more actions and programming information.

In one embodiment, a method includes coupling an onboard diagnostic interface device with an engine control unit of a vehicle, communicatively linking (via one or more communication networks) the interface device with a back end programming machine that is remotely located from the vehicle, communicating identifying information about the vehicle to the programming machine via the interface device and the one or more communication networks, determining (at the programming machine) programming information needed to program the engine control unit of the vehicle to accept a replacement key to activate the vehicle, sending the programming information from the programming machine to the interface device via the one or more communication networks, and programming the engine control unit of the vehicle to accept the replacement key to activate the vehicle using the one or more actions and programming information.

In one embodiment, a system includes a back-end programming machine including hardware circuitry and one or more processors configured to establish a communication connection with an engine control unit of a vehicle that is remotely located from the programming machine via an onboard diagnostic interface device and one or more communication networks. The one or more processors are configured to receive identifying information about the vehicle from the engine control unit via the interface device and the one or more communication networks. The one or more processors also configured to determine programming information needed to program the engine control unit of the vehicle to accept a replacement key to activate the vehicle. The one or more processors are configured to send the programming information to the interface device via the one or more communication networks and to program the engine control unit of the vehicle to accept the replacement key to activate the vehicle using the programming information.

BRIEF DESCRIPTION OF THE DRAWINGS

The presently described subject matter will be better understood from reading the following description of non-limiting embodiments, with reference to the attached drawings, wherein below.

DETAILED DESCRIPTION

Figure 1:
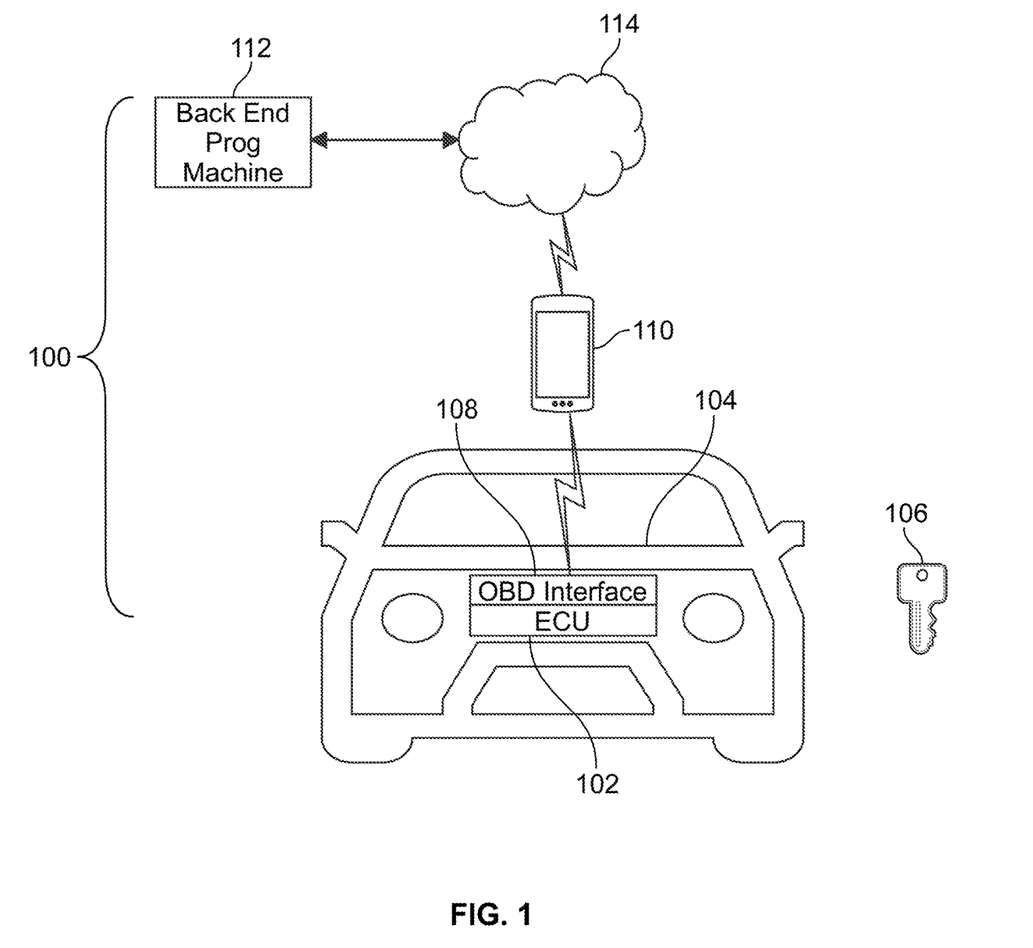
FIG. 1 illustrates one embodiment of a remote programming system.

FIG. 1 illustrates one embodiment of a remote programming system 100. The system 100 operates to remotely program an engine control unit 102 ("ECU" in FIG. 1) of a vehicle 104 to accept a key 106, such as a replacement key for a lost or otherwise unavailable previous key of the vehicle 104. In one embodiment, the key 106 is a tangible object that can include hardware circuitry that stores and communicates unique identifying information of the key 106 to the engine control unit 102. Optionally, the key 106 is an intangible electronic key. For example, the key 106 can be a fingerprint, voice command, face, or the like, that is recognized by the engine control unit 102 as being associated with a person or group of persons allowed to activate the vehicle 104. The engine control unit 102 can include a fingerprint scanner, a microphone, a camera, a sensor for a structured light array, or the like, that can detect the fingerprint, voice command, face, or the like, of the person in the vehicle 104 to determine whether the fingerprint, voice command, face, or the like, belongs to or is from a person allowed to start the vehicle 104. The engine control unit 102 can include or have access to a tangible and non-transitory computer readable medium (also referred to as a memory or memory device), such as a read only or random access computer memory. Identifying information of one or more keys can be stored in this memory device and accessible by the engine control unit 102.

The key 106 may send or otherwise communicate (e.g., through wired communication, through radio frequency identification communication or other wireless communication, or the like) the unique identifying information stored in the key 106 to the engine control unit 102. The engine control unit 102 allows the vehicle 104 to start if the unique identifying information obtained from the key 106 matches the unique identifying information stored in the memory accessible by or included in the engine control unit 102. If the unique identifying information obtained from the key 106 does not match or otherwise correspond with the unique identifying information stored in the memory accessible by or included in the engine control unit 102, then the engine control unit 102 does not allow the key 106 to start the vehicle 104. While the description herein focuses on automobiles as the vehicles, optionally, one or more embodiments may relate to other vehicles, such as marine vessels or other vehicles requiring use of a key 106 to start an ignition system of the vehicle.

The key 106 can represent a replacement key for the vehicle 104. For example, the key previously used to start the vehicle 104 may be lost, stolen, or otherwise unavailable (e.g., during a repossession of the vehicle 104, the currently used key may not be available). In operation, an operator of the system 100 contacts a manufacturer of the vehicle 104 to obtain a key code. This code can indicate an acceptable shape of the key 106 for inserting into an ignition of the vehicle 104. The operator can obtain the key 106 having the acceptable shape, but the key 106 may have unique identifying information that does not match the acceptable unique identifying information stored in the engine control unit 102. Therefore, the operator needs to program or re-program the engine control unit 102 to accept the unique identifying information of the key 106 to allow for the key 106 to start the vehicle 104.

In one embodiment, the operator couples an onboard diagnostic interface device 108 ("OBD Interface" in FIG. 1) with the engine control unit 102. For example, the interface device 108 can be an onboard diagnostic card (e.g., OBD2) having a connector that couples or otherwise engages with a matching connector of the engine control unit 102. The Coupling the interface device 108 with the engine control unit 102 allows the interface device 108 and the engine control unit 102 to communicate with each other. The interface device 108 and/or the engine control unit 102 can include wireless transceiving circuitry (e.g., antenna, transponder, modem, etc.) that allows the interface device 108 and the engine control unit 102 to wirelessly communicate with each other.

The interface device 108 can be an onboard diagnostic device that couples with the engine control unit 102 to obtain data signals from the engine control unit 102. These signals can include diagnostic information about the vehicle 104, a current and/or past locations of the vehicle 104 (e.g., from a global positioning system receiver onboard the vehicle 104), indications of whether the unique identifying information of the key for the vehicle 104 has been changed and/or when the change occurred, indications of whether the unique identifying information for the key was changed, etc.

In the illustrated embodiment, the interface device 108 links with an electronic mobile or hand-held device 110, such as a mobile phone, a tablet computer, a laptop computer, or the like. The hand-held device 110 represents hardware circuitry that includes and/or is connected with one or more processors (e.g., one or more microprocessors, field programmable gate arrays, and/or integrated circuits) that perform operations described herein. The hand-held device 110 can operate using one or more software applications that cause the hand-held device 110 to be programmed to program a new or replacement identifying information for the replacement key 106 in the engine control unit 102. The mobile device 110 can include wireless transceiving circuitry that wirelessly communicates with the interface device 108. For example, the mobile device 110 and/or interface device 108 can include Bluetooth™ communication circuitry, communication circuitry that wirelessly communicates using the IEEE 802.11 standards, radio frequency identification communication circuitry, or the like. Optionally, the interface device 108 can be a wire, cable, or the like, that is connected with and communicatively couples the engine control unit 102 with the hand-held device 110.

The hand-held device 110 can include an electronic display (e.g., a display screen, a projector, etc.) that can present information or guidance to the operator to walk the operator through the process of coding the replacement key 106 into the memory of the engine control unit 102. The hand-held device 110 and the interface device 108 establish a wired or wireless communication link between the devices 108, 110, and the hand-held device 110 optionally obtains information from the engine control unit 102 via the interface device 108. For example, the hand-held device 110 can obtain the vehicle identification number of the vehicle 104, the unique identifying information of the previous or current key 106 of the vehicle 104, the last time the key 106 was replaced, the location(s) where the vehicle 104 currently is and/or has traveled in the past, or the like.

The hand-held device 110 communicates with a remotely located back end programming machine 112 ("Back End Prog Machine" in FIG. 1) via or through one or more computerized communication networks 114. For example, a cell phone of the operator can run or otherwise operate a software application that communicates with both the interface device 108 and the back-end programming machine 112. The interface device 108 may be local (e.g., within two meters) to the hand-held device 110, while the programming machine 112 is remotely located (e.g., in another building, in another ZIP code, in another city, in another county, in another state, or in another country) from the hand-held device 110 and the vehicle 104. The network(s) 114 can represent one or more communication networks formed from computer devices such as routers, antennas, modems, switches, or the like, that communicate data (e.g., data packets) via wired and/or wireless connections between the computer devices in the network(s) 114. The network(s) 114 can include public and/or private communication networks. In one embodiment, the network 114 is formed entirely of the publicly available portions of the Internet.

The programming machine 112 also represents hardware circuitry that includes and/or is connected with one or more processors. For example, the programming machine 112 can be one or more servers, databases, or other computer devices. In one embodiment, the programming machine 112 is not a single physical machine (e.g., hardware) but may be software running on cloud-based computing devices. Interaction with such a machine 112 can involve interacting with a web-based dashboard, website, or the like, to remotely program a key.

The programming machine 112 stores and/or operates using one or more software applications that determine action sequences to be performed to program the engine control unit 102 based on identifying information provided by the hand-held device 110. For example, different sequences of actions may be associated with different makes and/or models of vehicles 104 for programming the engine control units 102 of the vehicles 104 to accept and operate using the replacement key 106. One example of such a sequence is turning on the hazard lights of the vehicle 104, followed by turning the replacement key 106 in the ignition to the ON position, followed by sending a designated sequence of data packets containing authentication information to the engine control unit 102, followed by sending the unique identifying information for the replacement key 106, followed by turning off the hazard lights of the vehicle 104. Another sequence could be turning the replacement key 106 in the ignition of the vehicle 104 to a designated position (e.g., ON), followed by pressing an unlock button on the replacement key 106, followed by pressing and holding a button on the dashboard of the vehicle 104, followed by pressing the lock button on the replacement key 106 three times, followed by sending a designated sequence of data packets containing the unique identifying information of the replacement key 106. Other sequences may be stored in or at the programming machine 112 and associated with different makes and/or models of the vehicles 104.

The programming machine 112 receives one or more data signals from the hand-held device 110 via the network(s) 114 that identifies the vehicle 104, such as by providing the make, model, year, identification number, and the like, from the interface device 108 to the hand-held device 110, and from the hand-held device 110 to the programming machine 112 via the network(s) 114. Optionally, other information can be obtained and provided to the machine 112 in addition to or in place of the previously listed information.

The programming machine 112 receives the information from the engine control unit 102 of the vehicle 104 via the communication bridge between the engine control unit 102 and the machine 112 that is formed by the interface device 108, the hand-held device 110, and the network(s) 114. The programming machine 112 uses this information received from the engine control unit 102 to determine (e.g., look up in a table, database, or the like), the action sequence, authentication information, and the like, that is needed for re-programming the engine control unit 102 to activate the vehicle 104 using the replacement key 106 (and to prevent another key, including the current or previous key(s), from activating the vehicle 104). The programming machine 112 sends instruction signals to the hand-held device 110 that directs the hand-held device 110 to instruct the operator of the device 110 at the vehicle 104 to perform one or more actions, to confirm performance of one or more actions, and/or to obtain other information. The hand-held device 110 can provide these instructions via one or more output devices, such as a touchscreen or display screen of the device 110, via speakers of the device 110, or the like.

The information sent by the programming machine 112 to the hand-held device 110 can be presented to the operator via the device 110 (e.g., to perform one or more actions during the programming of the engine control unit 102) and/or can be sent to the engine control unit 102. In one embodiment, an operator of the programming machine 112 can monitor progress of the programming of the engine control unit 102 and optionally can provide instructions to guide the operator of the hand-held device 110 to reprogram the engine control unit 102. Performance of the actions in the designated sequence and/or storage of information provided by the programming machine 112 to the engine control unit 102 can program the engine control unit 102 to accept the replacement key 106. The programming machine 112 and/or hand-held device 110 can exchange other information, such as data indicating that the engine control unit 102 was successfully programmed or re-programmed to accept the replacement key 106, the location where the engine control unit 102 was when the programming or re-programming of the engine control unit 102 occurred, or the like. This information can be stored at the programming machine 112. The vehicle 104 can then be turned on or off using the replacement key 106, and other keys (e.g., previous keys) may no longer be used to turn the vehicle 104 on or off.

Optionally, the programming of the engine control unit 102 to accept the new key 106 (and not accept the previous or other keys) can be automatically performed by the programming machine 112 without additional operator intervention. For example, the programming machine 112 can automatically re-program the engine control unit 102 responsive to a communication connection between the programming machine 112 and the engine control unit 102 via the OBD interface 108 and the device 110. This re-programming can occur without instructions being provided to a user on the device 110 (or elsewhere) and/or without requiring the operator to perform one or more actions with the vehicle.

The additional information that is sent to the programming machine 112, such as the successful reprogramming of the engine control unit 102, the location where the reprogramming occurred, etc., can be communicated to the hand-held device 110 or to other computing devices to verify when and/or where the successful programming of the engine control unit 102 to accept the replacement key 106 occurred. This information can be useful to determine whether a party's contention that the engine control unit 102 has not been programmed to accept the replacement key 106 (e.g., an unscrupulous locksmith seeking to perform and charge for unnecessary services), to determine whether the engine control unit 102 was programmed to accept the replacement key 106 before possession of the vehicle 104 was transferred to a transportation company (e.g., to determine who is responsible for the loss of the replacement key 106), or the like.

Following reprogramming of the engine control unit 102, the hand-held device 110 can be communicatively decoupled from the interface device 108 (e.g., by interrupting or terminating the Wi-Fi or Bluetooth™ connection therebetween), the interface device 108 can be decoupled from the vehicle 104 and engine control unit 102, and/or the hand-held device 110 can be communicatively decoupled from the programming machine 112. The programming machine 112 can be used to reprogram the same or another engine control unit 102 via the same or different network(s) 114, hand held device 110, and/or interface device 108. At least one technical effect of the inventive subject matter described herein includes the ability to remotely reprogram engine control units of vehicles without having a person with specialized training or equipment being required to travel to the location of the vehicles. This can allow for many more engine control units to be reprogrammed from a single location in much less time than is achievable by currently known technologies and techniques.

The various components of the system 100 include separate pieces or items of hardware that are remotely located from each other and that operate in concert with each other to improve the operation of the engine control unit 102 and the vehicle 104. For example, the programming machine 112 may be the only component of the system 100 that includes (at least some of) the information needed to reprogram the engine control unit 102 to accept the replacement key 106. The interface device 108 may be the only component of the system 100 that is able to couple with and interface with the engine control unit 102 to both obtain information from the engine control unit 102 that is needed to reprogram the unit 102 for the replacement key 106 and to provide information to the engine control unit 102 for programming the engine control unit 102 to accept the replacement key 106. But, the interface device 108 and the programming machine 112 may not be capable of communicating with each other over large distances. Therefore, the hand-held device 110 and the network(s) 114 are able to use the communication hardware and circuitry contained therein to allow the programming machine 112 to remotely program the engine control unit 102. Additionally, the output capabilities of the hand-held device 110 allow for the programming machine 112 to provide instructions to an operator of the hand-held device 110 to implement actions required to reprogram the engine control unit 102.

Figure 2:
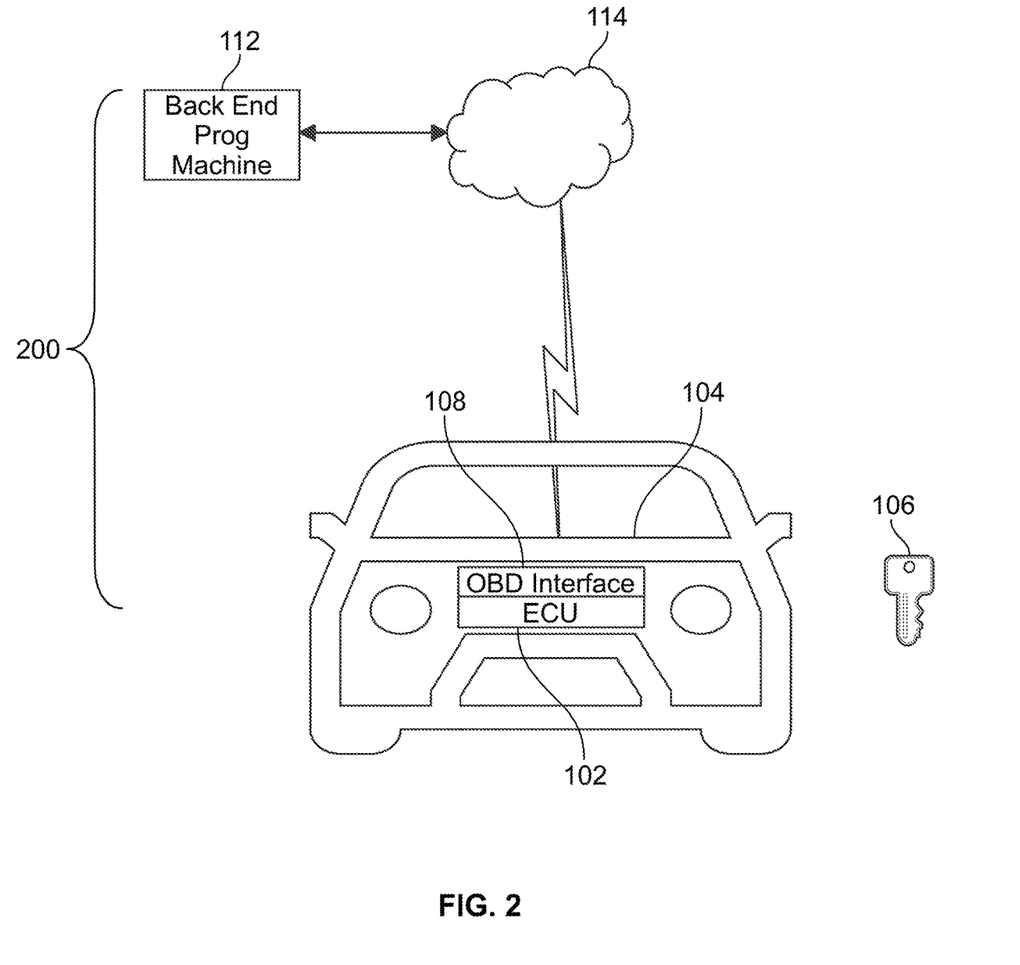
FIG. 2 illustrates another embodiment of a remote programming system.

FIG. 2 illustrates another embodiment of a remote programming system 200. The system 200 operates to remotely program the engine control unit 102 of the vehicle 104 to accept the replacement key 106 similar to the system 100 described in connection with FIG. 1. Several of the same components in the system 100 are also included in the system 200, and can operate in the same or equivalent manner.

One difference between the systems 100, 200 is the absence of the hand-held device 110 shown in FIG. 1. The transceiving circuitry of the interface device 108 can communicate with the programming machine 112 via the network(s) 114 to program the engine control unit 102 without communicating via or using the hand-held device 110. The information sent from the programming machine 112 can be sent to the interface device 108 without going through the hand-held device 110, and information sent from the engine control unit 102 and/or interface device 108 can be sent to the programming machine 112 without going through the hand-held device 110.

Figure 3:
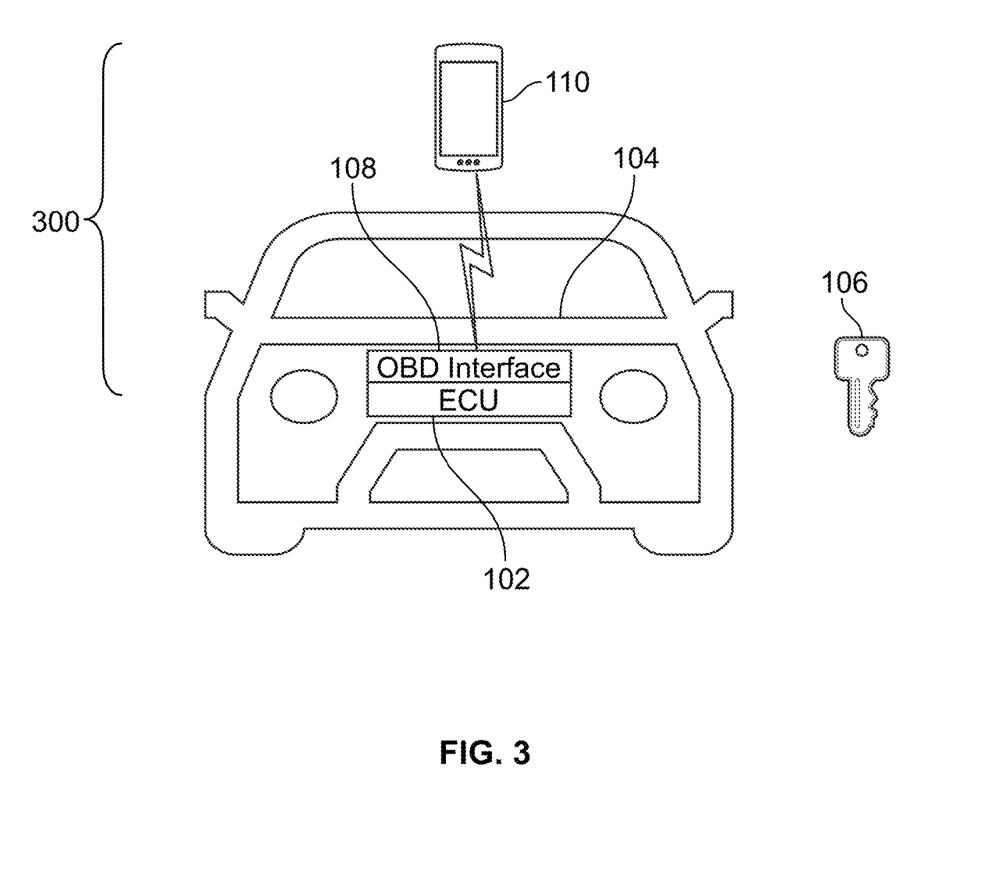
FIG. 3 illustrates another embodiment of a remote programming system.

FIG. 3 illustrates another embodiment of a remote programming system 300. The system 300 operates to remotely program the engine control unit 102 of the vehicle 104 to accept the replacement key 106 similar to the system 100 described in connection with FIG. 1. Several of the same components in the system 100 are also included in the system 300, and can operate in the same or equivalent manner.

One difference between the systems 100, 300 is the absence of the remotely located programming machine 112 (shown in FIGS. 1 and 2) and/or the use of the network(s) 114. For example, the information stored in or otherwise provided by the programming machine 112 via the network(s) 114 to the hand-held device 110 can be stored in the device 110 or can be obtained from another location by the device 110. The device 110 can then act or operate as the programming machine 112 to program the engine control unit 102 to accept the replacement key 106.

Figure 4:
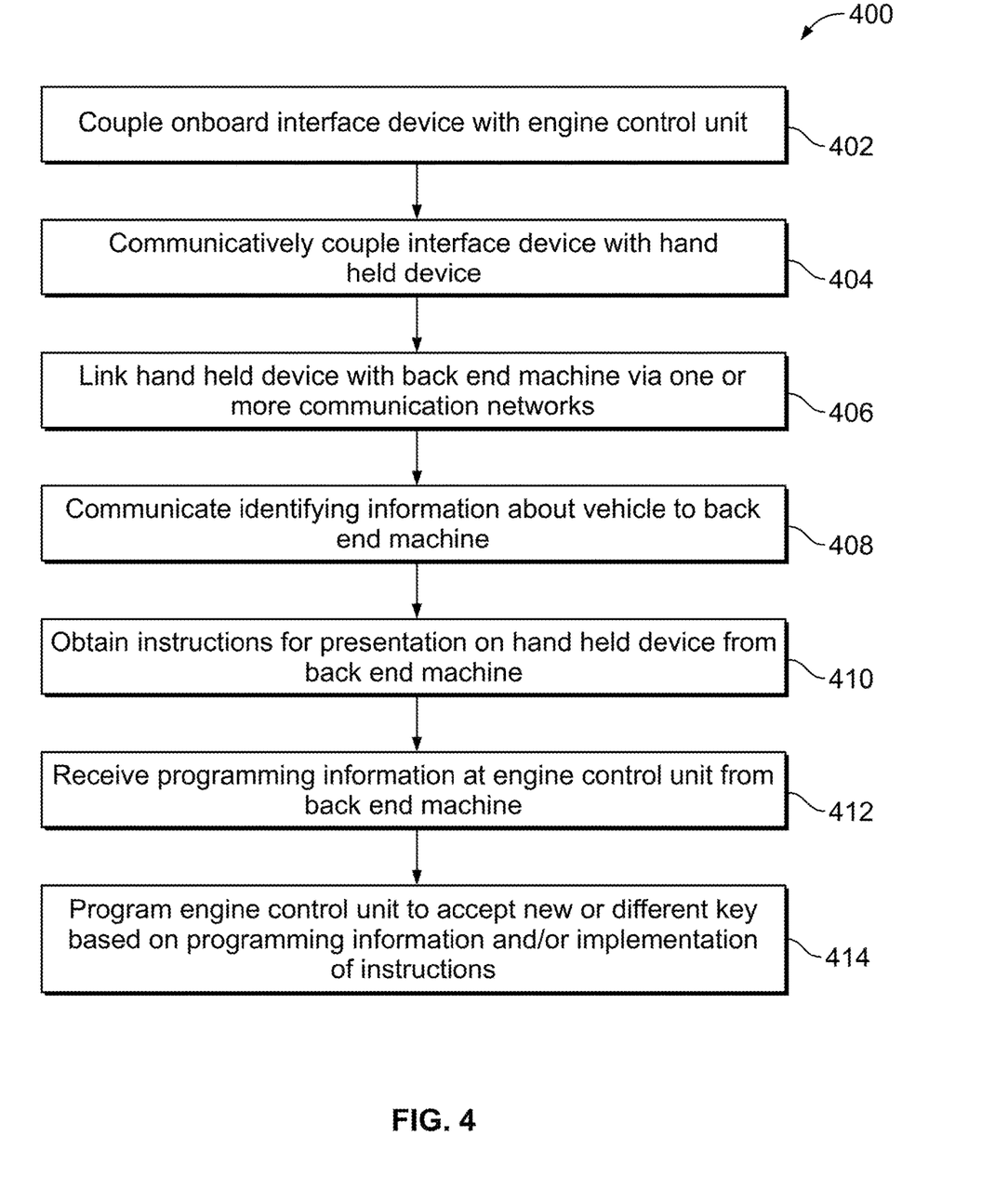
FIG. 4 illustrates a flowchart of one embodiment of a method for remotely programming an engine control unit of a vehicle to accept a replacement key for the vehicle.

FIG. 4 illustrates a flowchart of one embodiment of a method 400 for remotely programming an engine control unit of a vehicle to accept a replacement key for the vehicle.

The method 400 can demonstrate operations performed by one or more of the systems 100, 200, 300 to program or reprogram the engine control unit 102 of a vehicle 104 to be activated by a replacement key 106. At 402, an onboard interface device is coupled with an engine control unit of a vehicle. For example, the interface device 108 can be conductively coupled with a connector of the engine control unit 102. At 404, the interface device is communicatively coupled with a hand-held device. For example, the interface device 108 and/or the hand-held device 110 can create a wireless and/or wired connection therebetween for communication between the devices 108, 110. Optionally, the interface device 108 is not communicatively coupled with the hand-held device, as described below.

At 406, the hand-held device is linked with a back-end programming machine via one or more communication networks. For example, the hand-held device 110 can be communicatively coupled with the remotely located programming machine 112 via the one or more networks 114. Optionally, the interface device 108 is not communicatively coupled with the hand-held device 110, but is communicatively coupled with the programming machine 112 via the network(s) 114.

At 408, identifying information about the vehicle is communicated from the engine control unit of the vehicle, the interface device, and/or the hand-held device to the programming machine. This information can include a vehicle identification number, a confirmation or other indication from an operator of the hand-held device, or the like. This information allows the programming machine to determine what information and/or sequence of actions are needed to program the engine control unit to accept a replacement key.

At 410, instructions for presentation on the hand-held device are obtained from the programming machine. For example, directions on which buttons or other input devices of the vehicle to actuate, directions on when to actuate the buttons or input devices, or other directions, can be obtained by the programming machine 112 based on the identifying information about the vehicle 104. The programming machine 112 can direct the hand-held device 110 to present alphanumeric text, pictures, videos, etc., to the operator of the hand-held device 110 to walk the operator through the sequence of actions needed to program the engine control unit 102 to accept the replacement key 106. Optionally, the hand-held device 110 is not used, and the programming machine 112 can perform the required sequence of actions via signals remotely sent via the network(s) 114 to the engine control unit 102, can direct the engine control unit 102 to provide the instructions to the operator (e.g., via a display screen and/or speakers onboard the vehicle 104), or can communicate the instructions to the operator in another way.

At 412, programming information is received by the engine control unit from the programming machine. For example, secure and/or unique data signals that direct the engine control unit 102 to be programmed or reprogrammed to accept the replacement key 106 can be sent from the programming machine 112 to the engine control unit 102 via the hand-held device 110 and/or interface device 108.

At 414, the engine control unit is programmed to accept the replacement key. For example, the sequence of actions performed by the operator of the hand-held device 110 and/or the information sent to the engine control unit 102 from the remotely located programming machine 112 via the hand-held device 110 and/or interface device 108 can direct the engine control unit 102 to no longer accept other keys to activate the vehicle 104, but to only accept the replacement key 106 to activate the vehicle 104. As described above, other information can be communicated from the engine control unit 102 and/or hand-held device 110 to the programming machine 112, such as whether the programming of the engine control unit 102 was successful, when and/or where the successful programming occurred, and the like.

One or more embodiments of the systems and methods described herein allow for the specialized training and expertise involved in programming engine control units of vehicles to accept replacement keys to be remotely located from the vehicles while also programming the engine control units of the vehicles. This permits many persons not having the specialized training or expertise (e.g., of a locksmith) to operate in conjunction with the programming machine using devices (e.g., a mobile phone and onboard diagnostic device) that many people or companies already possess to program the engine control units to accept replacement keys. Additionally, the trained persons having the knowledge and expertise to program the engine control units can be located in a single location and to concurrently work with many remotely located vehicles to reprogram many more engine control units at a faster rate than currently is available (e.g., due to the need for the specialized persons to travel to the vehicle locations and/or to move between vehicle locations).

In one embodiment, a method includes coupling an onboard diagnostic interface device with an engine control unit of a vehicle, communicatively linking the interface device with a mobile, hand held device, communicatively linking (via one or more communication networks) the hand held device with a back end programming machine that is remotely located from the vehicle, communicating identifying information about the vehicle to the programming machine via the interface device, the hand held device, and the one or more communication networks, determining (at the programming machine) one or more actions and programming information needed to program the engine control unit of the vehicle to accept a replacement key to activate the vehicle, sending the one or more actions and programming information from the programming machine to the hand held device via the one or more communication networks, and programming the engine control unit of the vehicle to accept the replacement key to activate the vehicle using the one or more actions and programming information.

Optionally, the hand-held device is a mobile phone.

Optionally, the interface device is an onboard diagnostic card.

Optionally, the programming machine is remotely located from the vehicle by the programming machine being in one or more of a different building, a different city, a different ZIP code, a different state, or a different country than the vehicle.

Optionally, prior to programming the engine control unit of the vehicle to accept the replacement key to activate the vehicle, the engine control unit is restricted to only accepting another previous key to activate the vehicle.

Optionally, coupling the interface device with the engine control unit includes plugging the interface device into a connector interface of the engine control unit in the vehicle.

Optionally, communicatively linking the interface device with the hand-held device includes establishing a wireless communication connection between the interface device and the hand-held device.

Optionally, communicatively linking the interface device with the hand-held device includes connecting the interface device and the hand-held device with one or more wires or cables.

Optionally, communicatively linking the hand-held device with the programming machine includes establishing a wireless communication connection between the hand-held device and the one or more communication networks.

Optionally, communicating the identifying information about the vehicle to the programming machine via the interface device includes obtaining the identifying information from the engine control unit using the interface device. The identifying information can include at least a vehicle identification number.

Optionally, determining the one or more actions and programming information needed to program the engine control unit of the vehicle to accept the replacement key includes using the identifying information about the vehicle to select the one or more actions and programming information from among different sets of actions and programming information that are associated with different vehicles.

Optionally, the one or more actions that are sent to the hand-held device include operations to be performed by an operator of the hand-held device using the vehicle.

Optionally, the method also includes directing the hand-held device to present the operator with the one or more actions to be performed via an output device of the hand-held device.

Optionally, the method also includes sending additional information from the engine control unit to the programming machine via the interface device, the hand-held device, and the one or more communication networks.

Optionally, the additional information includes an indication that the engine control unit was successfully programmed to accept the replacement key.

Optionally, the additional information includes a location of the vehicle when the engine control unit was programmed to accept the replacement key.

In one embodiment, a system includes a back-end programming machine including hardware circuitry and one or more processors configured to establish a communication connection with an engine control unit of a vehicle that is remotely located from the programming machine via an onboard diagnostic interface device, a mobile, hand held device, and one or more communication networks. The one or more processors are configured to receive identifying information about the vehicle from the engine control unit via the interface device, the hand-held device, and the one or more communication networks. The one or more processors also are configured to determine one or more actions and programming information needed to program the engine control unit of the vehicle to accept a replacement key to activate the vehicle. The one or more processors are configured to send the one or more actions and programming information to the hand-held device via the one or more communication networks and to program the engine control unit of the vehicle to accept the replacement key to activate the vehicle using the one or more actions and programming information.

Optionally, the hand-held device is a mobile phone.

Optionally, the interface device is an onboard diagnostic card.

Optionally, the programming machine is remotely located from the vehicle by the programming machine being in one or more of a different building, a different city, a different ZIP code, a different state, or a different country than the vehicle.

Optionally, prior to programming the engine control unit of the vehicle to accept the replacement key to activate the vehicle, the engine control unit is restricted to only accepting another previous key to activate the vehicle.

Optionally, the one or more processors are configured to be communicatively connected with the interface device and the hand-held device via a wireless communication connection between the interface device and the hand-held device.

Optionally, the one or more processors are configured to be communicatively coupled with the engine control unit via one or more wires or cables between the hand-held device and the interface device.

Optionally, the one or more processors are configured to be communicatively connected with the hand-held device via a wireless communication connection between the hand-held device and the one or more communication networks.

Optionally, the one or more processors are configured to receive the identifying information about the vehicle by obtaining the identifying information from the engine control unit using the interface device. The identifying information can include at least a vehicle identification number.

Optionally, the one or more processors are configured to determine the one or more actions and programming information needed to program the engine control unit of the vehicle to accept the replacement key by using the identifying information about the vehicle to select the one or more actions and programming information from among different sets of actions and programming information that are associated with different vehicles.

Optionally, the one or more processors are configured to send the one or more actions to the hand-held device as instructions on operations to be performed by an operator of the hand-held device using the vehicle.

Optionally, the programming machine is configured to direct the hand-held device to present the operator with the one or more actions to be performed via an output device of the hand-held device.

Optionally, the one or more processors are configured to obtain additional information from the engine control unit to the programming machine via the interface device, the hand-held device, and the one or more communication networks.

Optionally, the additional information includes an indication that the engine control unit was successfully programmed to accept the replacement key.

Optionally, the additional information includes a location of the vehicle when the engine control unit was programmed to accept the replacement key.

In one embodiment, a method includes coupling an onboard diagnostic interface device with an engine control unit of a vehicle, communicatively linking (via one or more communication networks) the interface device with a back end programming machine that is remotely located from the vehicle, communicating identifying information about the vehicle to the programming machine via the interface device and the one or more communication networks, determining (at the programming machine) programming information needed to program the engine control unit of the vehicle to accept a replacement key to activate the vehicle, sending the programming information from the programming machine to the interface device via the one or more communication networks, and programming the engine control unit of the vehicle to accept the replacement key to activate the vehicle using the one or more actions and programming information.

Optionally, the interface device is an onboard diagnostic card.

Optionally, the programming machine is remotely located from the vehicle by the programming machine being in one or more of a different building, a different city, a different ZIP code, a different state, or a different country than the vehicle.

Optionally, prior to programming the engine control unit of the vehicle to accept the replacement key to activate the vehicle, the engine control unit is restricted to only accepting another previous key to activate the vehicle.

Optionally, coupling the interface device with the engine control unit includes plugging the interface device into a connector interface of the engine control unit in the vehicle.

Optionally, communicatively linking the interface device with the programming machine includes establishing a wireless communication connection between the interface device and the one or more communication networks.

Optionally, communicating the identifying information about the vehicle to the programming machine via the interface device includes obtaining the identifying information from the engine control unit using the interface device. The identifying information can include at least a vehicle identification number.

Optionally, determining the programming information needed to program the engine control unit of the vehicle to accept the replacement key includes using the identifying information about the vehicle to select the programming information from among different sets of programming information that are associated with different vehicles.

Optionally, the method also includes sending additional information from the engine control unit to the programming machine via the interface device and the one or more communication networks.

Optionally, the additional information includes an indication that the engine control unit was successfully programmed to accept the replacement key.

Optionally, the additional information includes a location of the vehicle when the engine control unit was programmed to accept the replacement key.

In one embodiment, a system includes a back-end programming machine including hardware circuitry and one or more processors configured to establish a communication connection with an engine control unit of a vehicle that is remotely located from the programming machine via an onboard diagnostic interface device and one or more communication networks. The one or more processors are configured to receive identifying information about the vehicle from the engine control unit via the interface device and the one or more communication networks. The one or more processors also configured to determine programming information needed to program the engine control unit of the vehicle to accept a replacement key to activate the vehicle. The one or more processors are configured to send the programming information to the interface device via the one or more communication networks and to program the engine control unit of the vehicle to accept the replacement key to activate the vehicle using the programming information.

Optionally, the interface device is an onboard diagnostic card.

Optionally, the programming machine is remotely located from the vehicle by the programming machine being in one or more of a different building, a different city, a different ZIP code, a different state, or a different country than the vehicle.

Optionally, prior to programming the engine control unit of the vehicle to accept the replacement key to activate the vehicle, the engine control unit is restricted to only accepting another previous key to activate the vehicle.

Optionally, the one or more processors are configured to be communicatively connected with the interface device via a wireless communication connection between the interface device and the one or more communication networks.

Optionally, the one or more processors are configured to receive the identifying information about the vehicle by obtaining the identifying information from the engine control unit using the interface device. The identifying information can include at least a vehicle identification number.

Optionally, the one or more processors are configured to determine the programming information needed to program the engine control unit of the vehicle to accept the replacement key by using the identifying information about the vehicle to select the programming information from among different sets of programming information that are associated with different vehicles.

Optionally, the one or more processors are configured to obtain additional information from the engine control unit to the programming machine via the interface device and the one or more communication networks.

Optionally, the additional information includes an indication that the engine control unit was successfully programmed to accept the replacement key.

Optionally, the additional information includes a location of the vehicle when the engine control unit was programmed to accept the replacement key.

As used herein, the terms "module", "system," "device," "circuit," or "unit," may include a hardware and/or software system and circuitry that operates to perform one or more functions. For example, a module, unit, device, circuit, or system may include a computer processor, controller, or other logic-based device that performs operations based on instructions stored on a tangible and non-transitory computer readable storage medium, such as a computer memory. Alternatively, a module, unit, device, circuit, or system may include a hard-wired device that performs operations based on hard-wired logic and circuitry of the device. The modules, units, circuits, or systems shown in the attached figures may represent the hardware and circuitry that operates based on software or hardwired instructions, the software that directs hardware to perform the operations, or a combination thereof. The modules, systems, devices, circuits, or units can include or represent hardware circuits or circuitry that include and/or are connected with one or more processors, such as one or computer microprocessors.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the inventive subject matter, including the best mode, and also to enable one of ordinary skill in the art to practice the embodiments of inventive subject matter, including making and using any devices or systems and performing any incorporated methods. The patentable scope of the inventive subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the present inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, or the like). Similarly, the programs may be stand alone programs, may be incorporated as subroutines in an operating system, may be functions in an installed software package, or the like. The various embodiments are not limited to the arrangements and instrumentality shown in the drawings.

As used herein, an element or step recited in the singular and proceeded with the word "a" or "an" should be understood as not excluding plural of said elements or operations, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "comprises," "including," "includes," "having," or "has" an element or a plurality of elements having a particular property may include additional such elements not having that property.

What is claimed is:

1. A method comprising:
   communicatively linking an interface device to a vehicle that is programmed to accept a first key for activating the vehicle;
   communicatively linking the interface device with a mobile electronic device, wherein the mobile electronic device includes an installed software application that communicates with the interface device;
   communicatively linking, via one or more communication networks, the mobile electronic device with a programming machine;
   communicating, by the installed software application, identifying information about the vehicle to the programming machine via the mobile electronic device and the one or more communication networks;
   storing programming information received from the programming machine via the one or more communication networks, wherein the programming information is provided by the programming machine in response to the identifying information about the vehicle; and
   based on the stored programming information, programming the vehicle to accept a tangible second key for activating the vehicle, wherein programming includes displaying, by the mobile electronic device, one or more prompts directing an operator to press or otherwise physically engage with at least one interactive physical element of the vehicle in furtherance of carrying out a sequence of actions that program the vehicle to accept the tangible second key.

2. The method of claim 1, wherein the mobile electronic device is one of a mobile phone, a tablet, a laptop computer, or hand-operated electronic device.

3. The method of claim 1, wherein programming the vehicle to accept the tangible second key includes storing unique identifying information of the tangible second key in a memory accessible by the vehicle.

4. The method of claim 1, wherein communicatively linking the interface device with the mobile electronic device includes one or more of: establishing a wireless communication connection between the interface device and the mobile electronic device, or connecting the interface device and the mobile electronic device with one or more wires or cables.

5. The method of claim 1, wherein unique identifying information of the tangible second key is stored in a first memory associated with the tangible second key and, after programming the vehicle, is stored in a second memory associated with the vehicle.

6. The method of claim 5, wherein the unique identifying information of the tangible second key includes one or more of a make, model, year, or vehicle identification number, or any information associated with the vehicle available via the OBD-II standard.

7. The method of claim 1, wherein the identifying information about the vehicle is used by the programming machine to select the programming information from among different sets of programming information that are associated with different vehicles.

8. The method of claim 1, wherein programming the vehicle to accept the tangible second key comprises programming the vehicle to no longer accept the first key.

9. The method of claim 1, further comprising providing an indication that the vehicle was successfully programmed to accept the tangible second key.

10. The method of claim 1, wherein communicatively coupling the interface device to the vehicle comprises establishing a wireless connection.

11. A method comprising:
    communicatively linking, via one or more communication networks, a mobile electronic device with a programming machine;
    causing the mobile electronic device to communicate identifying information about a vehicle to the programming machine via the one or more communication networks, wherein the vehicle is programmed to accept a first key for activating the vehicle;
    storing programming information received from the programming machine via the one or more communication networks, wherein the programming information is provided by the programming machine in response to the identifying information about the vehicle;

communicatively linking an interface device to the vehicle;

communicatively linking the mobile electronic device with the interface device; and programming the vehicle to accept a tangible second key for activating the vehicle, wherein the programming includes use of the stored programming information to display, by the mobile electronic device, one or more prompts directing an operator to press or otherwise physically engage with at least one interactive physical element of the vehicle in furtherance of carrying out a sequence of actions that program the vehicle to accept the tangible second key.

12. The method of claim 11, wherein the mobile electronic device is one of a mobile phone, a tablet, a laptop computer, or hand-operated electronic device.

13. The method of claim 11, wherein programming the vehicle to accept the tangible second key includes receiving and storing unique identifying information of the tangible second key in a memory accessible by the vehicle.

14. The method of claim 11, wherein communicatively linking the mobile electronic device with the interface device includes one or more of: establishing a wireless communication connection between the interface device and the mobile electronic device, or connecting the interface device and the mobile electronic device with one or more wires or cables.

15. The method of claim 11, wherein unique identifying information of the tangible second key is stored in a first memory associated with the tangible second key and, after programming the vehicle, is stored in a second memory associated with the vehicle.

16. The method of claim 11, wherein the identifying information about the vehicle includes one or more of a make, model, year, vehicle identification number, or any information associated with the vehicle available via the OBD-II standard.

17. The method of claim 11, further comprising using the identifying information about the vehicle to select the programming information from among different sets of programming information that are associated with different vehicles.

18. The method of claim 11, wherein programming the vehicle to accept the tangible second key comprises programming the vehicle to no longer accept the first key.

19. The method of claim 11, further comprising providing an indication that the vehicle was successfully programmed to accept the tangible second key.

20. A mobile computing device comprising one or more processors and memory storing instructions that, in response to execution by the one or more processors, cause the one or more processors to:

communicatively linking the mobile electronic device with an interface device that is communicatively linked to a vehicle, wherein the vehicle is programmed to accept a first key for activating the vehicle, and wherein the mobile electronic device includes an installed software application that communicates with the interface device;

communicatively linking, via one or more communication networks, the mobile electronic device with a programming machine;

communicating, by the installed software application, identifying information about the vehicle to the programming machine via the mobile electronic device and the one or more communication networks;

storing programming information received from the programming machine via the one or more communication networks, wherein the programming information is provided by the programming machine in response to the identifying information about the vehicle; and based on the stored programming information, displaying, by the mobile computing device, one or more prompts directing an operator to press or otherwise physically engage with at least one interactive physical element of the vehicle in furtherance of carrying out a sequence of actions that program the vehicle to accept a tangible second key for activating the vehicle.

* * * * *